United States Patent [19]

Laurent et al.

[11] Patent Number: 4,608,352

[45] Date of Patent: Aug. 26, 1986

[54] NEUTRON-ABSORBENT GLASSES CONTAINING GADOLINIUM AND PROCESS FOR THEIR PREPARATION

[75] Inventors: Yves Laurent, Cesson Sevigne; Patrick Verdier, Acigne, both of France

[73] Assignee: Centre National de la Recherche Scientifique (CNRS), Paris, France

[21] Appl. No.: 781,809

[22] Filed: Sep. 30, 1985

[30] Foreign Application Priority Data

Oct. 2, 1984 [FR] France .............................. 84 15103

[51] Int. Cl.[4] .......................... C03C 3/062; C03C 3/11
[52] U.S. Cl. ..................................... 501/73; 252/478; 501/27; 501/31; 501/56; 501/64
[58] Field of Search ...................... 501/64, 27, 31, 56, 501/73

[56] References Cited

U.S. PATENT DOCUMENTS

| | | | |
|---|---|---|---|
| 2,805,166 | 9/1957 | Löffler | 501/73 |
| 3,216,808 | 11/1965 | Bishop et al. | 501/64 |
| 3,887,807 | 6/1975 | Poignant et al. | 250/390 |
| 4,097,295 | 6/1978 | Chyung et al. | 501/56 |

FOREIGN PATENT DOCUMENTS

A2614185  6/1977  Fed. Rep. of Germany .

OTHER PUBLICATIONS

Tredway, W. K. et al., "Scandium-Containing Oxynitride Glass", Communications of Am. Cer. Soc–May 1985–pp. C–131–133.

Homeny, J. et al., "Preparation and Mechanical Properties of Mg-Al-Si-O-N Glasses"–J. Am. Cer. Soc.–Nov. 1984–Communications, pp. C225–227.

Lang, Jr. et al., "The Glassy Phase in the Lanthanide-Silicon-Aluminum-Oxygen-Nitrogen System", Chemical Abstracts, vol. 98, No. 26, Jun. 1983, p. 299, No. 220565b.

*Primary Examiner*—Helen M. McCarthy
*Attorney, Agent, or Firm*—Fleit, Jacobson, Cohn & Price

[57] ABSTRACT

The present invention relates to neutron-absorbent oxide or oxynitride glasses containing gadolinium and a process for their preparation.

The glasses according to the invention, which incorporate silicon, aluminum, oxygen or oxygen and nitrogen, additionally contain gadolinium in a proportion of approximately 5 to 15 atom %.

8 Claims, No Drawings

NEUTRON-ABSORBENT GLASSES CONTAINING GADOLINIUM AND PROCESS FOR THEIR PREPARATION

The present invention relates to neutron-absorbent glasses containing oxygen or oxygen and nitrogen and incorporating gadolinium in a proportion of approximately 5 to 15 atom %, and their manufacture.

Gadolinium possesses very powerful neutron-absorbent properties. Thus, the values of capture cross-sections may be given, as an example, for some elements (aluminum: 0.23; iron: 2.53; chromium: 2.9; nickel: 4.6; boron: 755) and may be compared to the much higher value for gadolinium: 46,000.

Earlier studies have made it possible to demonstrate the part played by nitrogen during the irradiation of nitrides with fast neutrons or when bombarded with heavy ions, thus, the effective cross-section for damage is approximately 500 times smaller than that of monazite, that is to say the irradiation resistance is multiplied by 500.

The ceramics referred to, called "Sialons" gave rise to research on nitrogen-containing glasses. The addition of a metal oxide which is necessary for better densification of these materials leads to the formation of a vitreous phase.

The replacement of oxygen by tricoordinated nitrogen in a vitreous lattice gives rise to a double effect:

an increase in the refractory nature, in density, in Young's and shear moduli, in hardness, and the like, a decrease in the size of the vitreous zones as a function of the proportion of nitrogen. Nitrogen is not a vitrifying agent (no completely nitrogenated glasses are known).

The study of nitrogen-containing vitreous phases is recent, the combination of gadolinium with these phases is novel.

The present invention relates to neutron-absorbent glasses comprising silicon, aluminum, oxygen and/or nitrogen, which additionally contain gadolinium in a proportion of approximately 5 to 15 atom %.

In particular, it relates to oxygen-containing glasses the gadolinium oxide content of which is of the order of 10 to 30 mol%, that is to say that the gadolinium content of these neutron-absorbent glasses according to the invention is of the order of $10^{22}$ atoms of gadolinium per $cm^3$.

The present invention also relates to glasses containing oxygen and nitrogen in which the gadolinium oxide content remains slightly lower, of the order of approximately 10 to 20 mol%.

The neutron-absorbent glasses according to the invention contain the following elements in the atomic proportions detailed below:

| | |
|---|---|
| Si | 9.5 to 20.2% |
| Al | 5.6 to 16.0% |
| O | 52.3 to 64.0% |
| N | 0 to 10.0% |
| Gd | 5.4 to 14.7%. |

In the $SiO_2$-$Al_2O_3$-$Gd_2O_3$ diagram, the vitreous zone lies within the zone of molar composition:

| | |
|---|---|
| $Gd_2O_3$ | 10 to 30% |
| $SiO_2$ | 40 to 72% |
| $Al_2O_3$ | 10 to 35%. |

In the $SiO_2$-AlN-$Gd_2O_3$ diagram, the vitreous zone lies within the zone of molar composition:

| | |
|---|---|
| $SiO_2$ | 57 to 68% |
| AlN | 17 to 28% |
| $Gd_2O_3$ | 9 to 21%. |

In practice, the production of nitrogen-containing vitreous phases meets with difficulties due to the fact that the size of the vitreous zone is reduced in the presence of nitrogen.

The preparation of glasses containing oxygen and nitrogen is generally carried out by starting with reactants in the solid state. The nitrogen sources necessary for the preparation of nitrogen-containing glasses are generally $Si_3N_4$, $Si_2N_2O$, or AlN. Silicon nitride is less reactive and requires very high reaction temperatures. In order to obtain the largest vitreous zone at temperatures which are as low as possible, the nitrogen source employed is a particularly reactive aluminum nitride, prepared by the reaction of a stream of ammonia at a temperature below approximately 500° C. with alumina powder heated to a temperature of at least approximately 1200°. This process forms the subject of a French Patent Application filed this day in the name of Applicant Company under No. 84/15,104.

The present invention also relates to the process for the preparation of these neutron-absorbent glasses, in which process a powdered mixture containing, a particular, silicon oxide, aluminum oxide and/or nitride and gadolinium oxide is heated up to a temperature of approximately 1400° C. in metal crucibles and is cooled to produce vitrification. Using this process, glasses have been obtained, in particular for the following compositions of powdered mixtures:

| | |
|---|---|
| AlN | 25% |
| $Gd_2O_3$ | 15% |
| $SiO_2$ | 60% |
| or | |
| AlN | 20% |
| $Gd_2O_3$ | 15% |
| $SiO_2$ | 65% |
| or, again | |
| AlN | 18.2% |
| $Al_2O_3$ | 9.1% |
| $SiO_2$ | 54.5% |
| $Gd_2O_3$ | 18.2%. |

In the quinary diagram Gd-Si-Al-O-N glasses are also obtained for nitrogen contents ranging up to 10 atom %.

By way of illustration, three other examples of glasses according to the invention will be indicated below (Table I), together with their principal physical properties (Table II).

TABLE I

| | Atomic compositions of the glasses | | | | |
|---|---|---|---|---|---|
| | % N | % Gd | % O | % Al | % Si |
| Glass no. 1 | 0 | 9.40 | 63.8 | 7.73 | 19.07 |
| Glass no. 2 | 2.54 | 9.57 | 60.78 | 7.97 | 19.14 |
| Glass no. 3 | 5.15 | 9.69 | 57.70 | 8.05 | 19.41 |

TABLE II

| | Physical properties of the glasses | | | | |
|---|---|---|---|---|---|
| | density | hardness | Tg (°C.) | α (°C.$^{-1}$) | E (GPa) |
| Glass no. 1 | 4.04 | 630 | 1090 | 5.73 10$^{-6}$ | 103.8 |
| Glass no. 2 | 4.08 | 700 | 1120 | 5.1 10$^{-6}$ | 113.5 |
| Glass no. 3 | 4.13 | 800 | 1145 | 5.0 10$^{-6}$ | 122.0 |

Tg = glass transition temperature
α = coefficient of thermal expansion
E = Young's modulus Metal crucibles made of, for example, molybdenum, containing a powdered mixture of silicon oxide, aluminum, gadolinium, and aluminum nitride for glasses containing oxygen and nitrogen, are arranged in a high-frequency furnace. The temperature is raised to 1400° C. in approximately 5 minutes, and this temperature is maintained for approximately 30 minutes in a nitrogen-based controlled atmosphere, for example of pure nitrogen or a nitrogen/hydrogen (90/10) mixture or any other nitrogen-based gaseous reducing mixture. The charged crucibles are cooled to produce glasses for at least 5 minutes in a nitrogen-based controlled atmosphere.

For oxygen-containing glasses, the same procedure is followed with powdered mixtures which are free from aluminum nitride. To prepare these oxygen-containing glasses it is also possible, if appropriate, to operate in a nitrogen atmosphere.

The chief property of the gadolinium glasses is that they are neutron-absorbent.

The value of the neutron absorption coefficient ($\mu$) has been measured for the glasses according to the invention:

For fast neutrons (energy above 10 keV), $\mu = 4.14$ cm$^{-1}$.

For thermal neutrons (energy of approximately 0.1 eV), $\mu = 760$ cm$^{-1}$.

The glasses according to the invention have been tested for their neutron-absorption characteristic by comparing the intensity $I_o$ of a flux of thermal neutrons to the intensity I of the same flux after its passage through a glass plate of thickness x.

The ratio of these intensities is given by the formula:

$$I/I_o = e^{-\mu x}$$

where
x is the thickness of the plate and
$\mu$ the neutron absorption coefficient.

In the case of thermal neutrons, the results are shown in the following table

| x (mm) | I/I$_o$ |
|---|---|
| 1 | 10$^{-33}$ |
| 0.1 | 10$^{-4}$ |

The act of associating nitrogen with the gadolinium glasses improves their chemical properties as well as their physical properties. In fact, the presence of nitrogen in the glasses increases both the mechanical properties and resistance to a hostile environment (for example concentrated HNO$_3$). In addition, they exhibit an exceptional resistance to dry or moist corrosion.

Compared to other gadolinium compounds, these glasses offer numerous advantages, some examples of which can be given, without the list being exhaustive:
homogeneous distribution of the gadolinium atoms
isotropy of the medium
quality of the physical and chemical properties
good suitability for applications in highly diversified forms, for example coating films
good conservation (the compound does not become amorphous).

It is consequently possible, using conventional methods, to obtain articles with the greatest variety of shapes, the purpose of which is to intercept or channel neutron fluxes.

We claim:

1. Neutron-absorbent oxide or oxynitride glasses incorporating silicon, aluminum, oxygen or oxygen and nitrogen, which additionally contain gadolinium in a proportion of approximately 5 to 15 atom %.

2. Neutron-absorbent glasses as claimed in claim 1, which have the following atomic compositions:

| | |
|---|---|
| Si | 9.5 to 20.2% |
| Al | 5.6 to 16.0% |
| O | 52.3 to 64.0% |
| N | 0 to 10.0% |
| Gd | 5.4 to 14.7%. |

3. Neutron-absorbent glasses as claimed in claim 1, wherein the gadolinium content is of the order of 10$^{22}$ atoms of Gd/cm$^3$.

4. Process for preparing neutron-absorbent oxide or oxynitride glasses, wherein a powdered mixture containing, in particular, silicon oxide, aluminum oxide and/or nitride and gadolinium oxide is heated in metal crucibles up to a temperature of approximately 1400° C. and is cooled to produce vitrification.

5. Process as claimed in claim 4, wherein the said powdered mixture corresponds to the following molar composition:

| | |
|---|---|
| SiO$_2$ | 40 to 72% |
| Al$_2$O$_3$ | 10 to 35% |
| Gd$_2$O$_3$ | 10 to 30%. |

6. Process as claimed in claim 4, wherein the said powdered mixture corresponds to the following molar composition:

| | |
|---|---|
| SiO$_2$ | 57 to 68% |
| AlN | 17 to 28% |
| Gd$_2$O$_3$ | 9 to 21%. |

7. Process as claimed in claim 4, wherein, in a high-frequency furnace, the temperature is raised to approximately 1400° C. in approximately 5 minutes, this temperature is maintained for approximately 30 minutes and cooling is applied to produce vitrification.

8. Process as claimed in claim 6, wherein the operation is carried out in a nitrogen-based controlled atmosphere.

* * * * *